(12) United States Patent
Clark et al.

(10) Patent No.: US 12,523,177 B1
(45) Date of Patent: Jan. 13, 2026

(54) ELECTRONIC CONTROLLER COOLING FOR AIRCRAFT PROPULSION SYSTEM

(71) Applicant: RTX Corporation, Farmington, CT (US)

(72) Inventors: Thomas E. Clark, Wells, ME (US); Murat Yazici, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/016,733

(22) Filed: Jan. 10, 2025

(51) Int. Cl.
  *F02C 9/16* (2006.01)
  *F02C 7/18* (2006.01)
  *F02C 7/32* (2006.01)

(52) U.S. Cl.
  CPC .................. *F02C 9/16* (2013.01); *F02C 7/18* (2013.01); *F02C 7/32* (2013.01)

(58) Field of Classification Search
  CPC ...... F02C 9/16; F02C 7/18; F02C 7/32; F01D 25/12; F01D 15/10
  See application file for complete search history.

(56) References Cited

U.S. PATENT DOCUMENTS

| | | | |
|---|---|---|---|
| 4,262,495 A * | 4/1981 | Gupta | B64D 13/06 62/89 |
| 4,351,150 A * | 9/1982 | Schulze | F02C 7/047 60/39.83 |
| 4,504,030 A * | 3/1985 | Kniat | F02C 7/14 60/39.83 |
| 4,934,154 A * | 6/1990 | Altoz | G11C 5/00 62/197 |
| 6,415,595 B1 * | 7/2002 | Wilmot, Jr. | F02C 7/224 60/785 |
| 10,399,683 B2 * | 9/2019 | Behrens | B64D 37/34 |
| 10,710,730 B2 * | 7/2020 | Zug | A62B 7/14 |
| 10,865,713 B2 * | 12/2020 | Dyer | F04D 29/5813 |
| 11,885,229 B2 | 1/2024 | Gerstler | |
| 2009/0139405 A1 * | 6/2009 | Schwarz | H05K 7/20181 96/17 |
| 2016/0362999 A1 * | 12/2016 | Ho | B64D 41/00 |
| 2019/0292993 A1 * | 9/2019 | Pal | B64D 27/16 |
| 2019/0379257 A1 * | 12/2019 | Gerstler | H02K 9/19 |
| 2020/0025081 A1 * | 1/2020 | Dyer | F02C 7/236 |
| 2020/0108937 A1 * | 4/2020 | Behrens | F02C 9/18 |
| 2024/0076043 A1 * | 3/2024 | Kubota | B64D 27/34 |
| 2024/0280053 A1 | 8/2024 | Sibbach | |

* cited by examiner

Primary Examiner — William H Rodriguez
(74) Attorney, Agent, or Firm — Getz Balich LLC

(57) ABSTRACT

An apparatus is provided for an aircraft. This apparatus includes an electric machine controller and an air cooling circuit. The electric machine controller includes controller circuitry and a controller housing. The controller circuitry is disposed within an interior of the controller housing. The air cooling circuit includes a cooling boot. The air cooling circuit is configured to direct air from an air source into the cooling boot. The cooling boot forms an air plenum with the electric machine controller. The cooling boot includes a plurality of air outlets. The cooling boot is configured to direct the air through the air outlets and into the air plenum to air cool the electric machine controller.

20 Claims, 8 Drawing Sheets

ELECTRONIC CONTROLLER COOLING FOR AIRCRAFT PROPULSION SYSTEM

BACKGROUND OF THE DISCLOSURE

1. Technical Field

This disclosure relates generally to an aircraft powerplant and, more particularly, to cooling electronics of the aircraft powerplant.

2. Background Information

An aircraft powerplant includes various electronics which may utilize heat dissipation during aircraft powerplant operation. Various heat dissipation systems and methods are known in the art. While these known heat dissipation systems and methods have various benefits, there is still room in the art for improvement.

SUMMARY OF THE DISCLOSURE

According to an aspect of the present disclosure, an apparatus is provided for an aircraft. This apparatus includes an electric machine controller and an air cooling circuit. The electric machine controller includes controller circuitry and a controller housing. The controller circuitry is disposed within an interior of the controller housing. The air cooling circuit includes a cooling boot. The air cooling circuit is configured to direct air from an air source into the cooling boot. The cooling boot forms an air plenum with the electric machine controller. The cooling boot includes a plurality of air outlets. The cooling boot is configured to direct the air through the air outlets and into the air plenum to air cool the electric machine controller.

According to another aspect of the present disclosure, another apparatus is provided for an aircraft that includes an aircraft propulsion system. The aircraft propulsion system includes an engine core, an electronic controller, an air cooling circuit and a liquid cooling circuit. The engine core includes a compressor section, a combustor section and a turbine section. The electronic controller is disposed within an internal compartment of the aircraft propulsion system. The air cooling circuit is configured to direct air from an air source outside of the engine core to the electronic controller to air cool the electronic controller. The liquid cooling circuit is configured to cool the electronic controller using a liquid working fluid.

According to still another aspect of the present disclosure, another apparatus is provided for an aircraft that includes an aircraft propulsion system. The aircraft propulsion system includes an open propulsor rotor, an electronic controller and an air cooling circuit. The electronic controller is disposed within an internal compartment of the aircraft propulsion system. The air cooling circuit includes an air circuit inlet disposed along an exterior surface of the aircraft propulsion system bordering an environment external to the aircraft propulsion system. The air cooling circuit is configured to direct air, received from the environment through the air circuit inlet, to the electronic controller to air cool the electronic controller.

The air source may be an environment external to the aircraft propulsion system.

The air cooling circuit may include a cooling boot. The cooling boot may form an air plenum with a surface of the electronic controller. The cooling boot may be configured to direct the air into the air plenum to air cool the electronic controller.

The cooling boot may be configured such that the air directed into the air plenum impingement cools the electric machine controller.

A first of the air outlets may be configured to direct a jet of the air through the air plenum to impinge against a surface of the electric machine controller.

The cooling boot may be configured such that the air directed into the air plenum convectively cools the electric machine controller.

The cooling boot may also include a manifold with a wall and an air cavity. The wall may be between and may extend along the air cavity and the air plenum. Each of the air outlets may extend through the wall from the air cavity to the air plenum.

The air plenum may extend along a surface of the electric machine controller. A centerline of a first of the air outlets may be angularly offset from the surface by an offset angle between seventy degrees and ninety degrees.

At least some of the controller circuitry may be mounted to a wall of the controller housing that forms a side of the air plenum.

At least some of the controller circuitry may be thermally coupled to a wall of the controller housing that forms a side of the air plenum.

The air cooling circuit may also include a flow regulator arranged inline between the air source and the cooling boot.

The air cooling circuit may also include a compressor arranged inline between the air source and the cooling boot.

The air source may be an environment external to the aircraft. The air cooling circuit may also include an air circuit inlet that fluidly couples the air cooling circuit to the environment.

The apparatus may also include an engine case. The electric machine controller may be mounted with the engine case. The electric machine controller may be disposed between the engine case and the cooling boot.

The apparatus may also include a liquid cooling circuit configured to further cool the electric machine controller using a liquid working fluid.

The liquid cooling circuit may extend through the electric machine controller.

The liquid cooling circuit may extend through a heat exchanger thermally coupled to the electric machine controller.

The apparatus may also include an electric machine configurable as an electric motor and/or an electric generator. The electric machine controller may be configured to control operation of the electric machine.

The apparatus may also include a turbine engine that include a flowpath, a compressor section, a combustor section and a turbine section. The flowpath may extend through the compressor section, the combustor section and the turbine section. The electric machine may be operatively coupled to the turbine engine.

The apparatus may also include an aircraft propulsion system that includes an open propulsor rotor. The aircraft propulsion system may be configured with the electric machine controller and the air cooling circuit.

The apparatus may also include an aircraft propulsion system that includes a ducted propulsor rotor. The aircraft propulsion system may be configured with the electric machine controller and the air cooling circuit.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
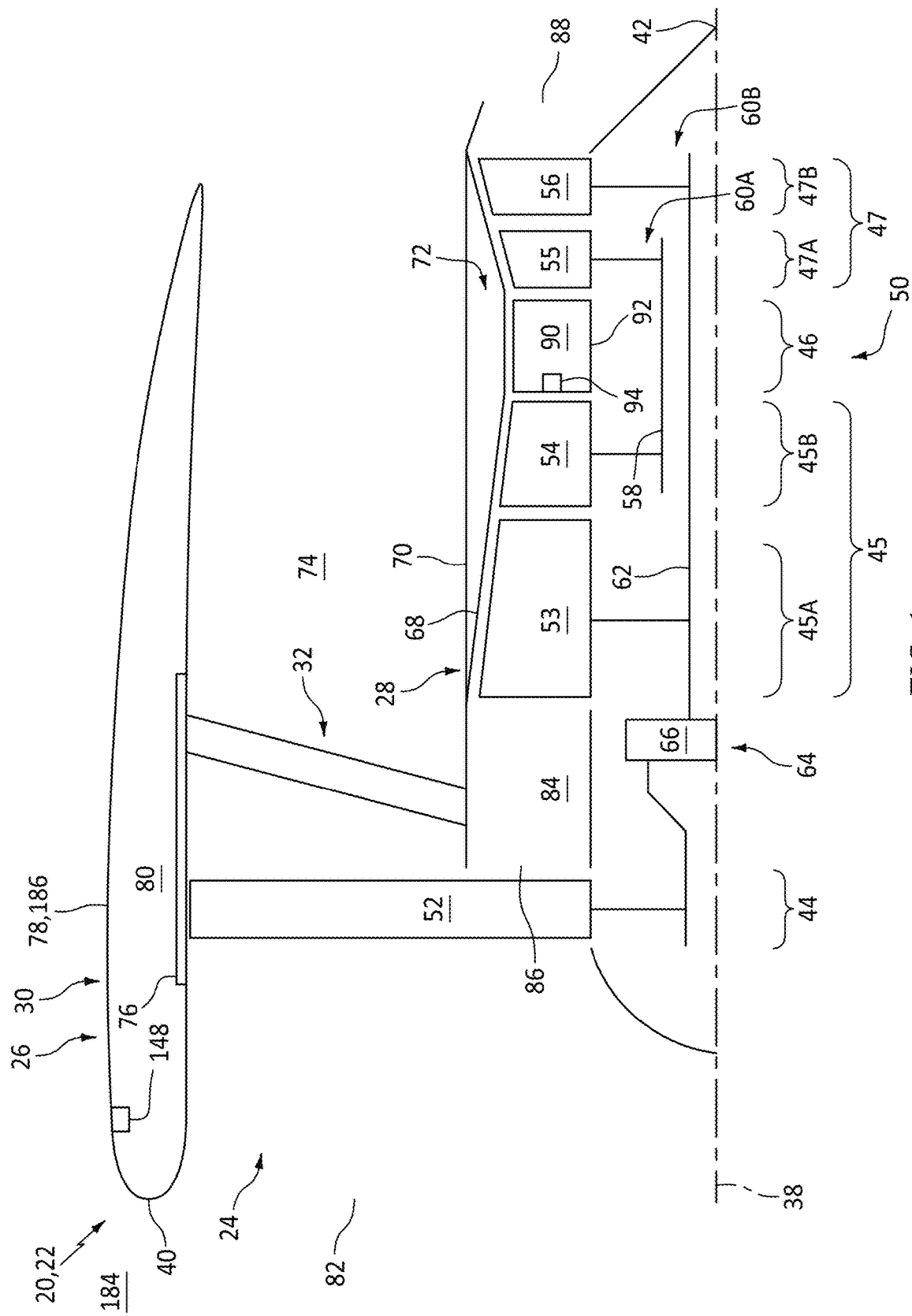
FIG. 1 is a partial schematic illustration of an aircraft propulsion system.

FIG. 1 illustrates a powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted or open rotor propulsion system. Moreover, the aircraft powerplant 20 is not limited to propulsion system applications. The aircraft powerplant 20, for example, may alternatively (or also) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 also includes an electric machine system 34 (see FIG. 2) and a heat exchange system 36 (see FIG. 3). The aircraft propulsion system 22 extends axially along an axis 38 between an axial forward, upstream end 40 of the aircraft propulsion system 22 and an axial aft, downstream end 42 of the aircraft propulsion system 22.

Briefly, the propulsion system axis 38 may be a centerline axis of the aircraft propulsion system 22, the turbine engine 24 and/or one or more of its members. The propulsion system axis 38 may also or alternatively be a rotational axis for one or more members of the turbine engine 24.

The aircraft propulsion system 22 and its turbine engine 24 of FIG. 1 include a propulsor section 44 (e.g., a fan section), a compressor section 45, a combustor section 46 and a turbine section 47. The compressor section 45 of FIG. 1 includes a low pressure compressor (LPC) section 45A and a high pressure compressor (HPC) section 45B. The turbine section 47 of FIG. 1 includes a high pressure turbine (HPT) section 47A and a low pressure turbine (LPT) section 47B. Here, at least (or only) the LPC section 45A, the HPC section 45B, the combustor section 46, the HPT section 47A and the LPT section 47B collectively form a core 50 of the turbine engine 24.

The engine sections 44-47B may be arranged sequentially along the propulsion system axis 38 within the propulsion system housing 26. The propulsor section 44 includes a bladed propulsor rotor 52; e.g., a fan rotor. The LPC section 45A includes a bladed low pressure compressor (LPC) rotor 53. The HPC section 45B includes a bladed high pressure compressor (HPC) rotor 54. The HPT section 47A includes a bladed high pressure turbine (HPT) rotor 55. The LPT section 47B includes a bladed low pressure turbine (LPT) rotor 56.

The HPC rotor 54 is coupled to and rotatable with the HPT rotor 55. The HPC rotor 54 of FIG. 1, for example, is connected to the HPT rotor 55 through a high speed shaft 58. At least (or only) the HPC rotor 54, the HPT rotor 55 and the high speed shaft 58 collectively form a high speed rotating structure 60A; e.g., a high speed spool of the engine core 50. This high speed rotating structure 60A of FIG. 1 and its members 54, 55 and 58 are rotatable about the propulsion system axis 38. However, it is contemplated the high speed rotating structure 60A may alternatively be rotatable about another axis radially and/or angularly offset from the rotational axis of the propulsor rotor 52 and/or the centerline axis of the turbine engine 24.

The LPC rotor 53 is coupled to and rotatable with the LPT rotor 56. The LPC rotor 53 of FIG. 1, for example, is connected to the LPT rotor 56 through a low speed shaft 62. At least (or only) the LPC rotor 53, the LPT rotor 56 and the low speed shaft 62 collectively form a low speed rotating structure 60B; e.g., a low speed spool of the engine core 50. This low speed rotating structure 60B is further coupled to the propulsor rotor 52 through a drivetrain 64. The drivetrain 64 may be configured as a geared drivetrain, where a geartrain 66 (e.g., a transmission, a speed change device, an epicyclic geartrain, etc.) is disposed between and operatively couples the propulsor rotor 52 to the low speed rotating structure 60B and its LPT rotor 56. With this arrangement, the propulsor rotor 52 may rotate at a different (e.g., slower) rotational speed than the low speed rotating structure 60B and its LPT rotor 56. Alternatively, the drivetrain 64 may be configured as a direct drive drivetrain, where the geartrain 66 is omitted. With such an arrangement, the propulsor rotor 52 rotates at a common (the same) rotational speed as the low speed rotating structure 60B and its LPT rotor 56. The low speed rotating structure 60B of FIG. 1 and its members 53, 56 and 62 as well as the propulsor rotor 52 are rotatable about the propulsion system axis 38. However, it is contemplated the low speed rotating structure 60B may alternatively be rotatable about another axis radially and/or angularly offset from the rotational axis of the propulsor rotor 52 and/or the centerline axis of the turbine engine 24.

The inner housing structure 28 of FIG. 1 includes an inner case 68 (e.g., a core case) for the turbine engine 24, an inner nacelle structure 70 (sometimes referred to as an inner fixed structure (IFS)) and an internal inner housing compartment 72 (e.g., an engine core compartment). The inner case 68 is disposed radially outboard of, extends axially along and may circumscribe one or more or all of the engine sections 45A-47B and the engine rotors 53-56. The inner case 68 may thereby house and provide a support structure for the respective engine sections 45A-47B and the engine rotors 53-56. The inner nacelle structure 70 is configured to provide an aerodynamic cover over the engine core 50 and its inner case 68. The inner housing compartment 72 of FIG. 1 is formed by and is disposed radially between the inner case 68 and an inner barrel of the inner nacelle structure 70. The inner housing structure 28 and its inner nacelle structure 70 may also form a radial inner peripheral boundary of a (e.g., annular) bypass flowpath 74 within the aircraft propulsion system 22.

The outer housing structure 30 of FIG. 1 includes an outer case 76 (e.g., a fan case) for the turbine engine 24, an outer nacelle structure 78 and an internal outer housing compartment 80. The outer case 76 is disposed radially outboard of, extends axially along and may circumscribe the propulsor section 44 and its propulsor rotor 52. The outer case 76 may thereby house and provide a containment structure for the propulsor section 44 and its propulsor rotor 52. The outer nacelle structure 78 is configured to provide an aerodynamic cover over the outer case 76. The outer housing compartment 80 of FIG. 1 is at least partially formed by and disposed radially between the outer case 76 and an outer portion (e.g., fan cowls) of the outer nacelle structure 78. The outer housing structure 30 and its outer nacelle structure 78 may also form a radial outer peripheral boundary of the bypass flowpath 74.

During operation, ambient air from outside of the aircraft enters the aircraft propulsion system 22 and its turbine engine 24 through an airflow inlet 82. This air is directed across the propulsor section 44 and into a (e.g., annular) core flowpath 84 and the bypass flowpath 74. The core flowpath 84 of FIG. 1 extends sequentially through the LPC section 45A, the HPC section 45B, the combustor section 46, the HPT section 47A and the LPT section 47B from an airflow inlet 86 into the core flowpath 84 to a combustion products exhaust 88 out from the core flowpath 84 and the engine core 50. The air entering the core flowpath 84 may be referred to as "core air". The bypass flowpath 74 extends through a bypass duct, which bypass flowpath 74 and bypass duct bypass (e.g., are disposed radially outboard of and extend along) the engine core 50 and the inner housing structure 28. The air within the bypass flowpath 74 may be referred to as "bypass air".

The core air is compressed by the LPC rotor 53 and the HPC rotor 54 and is directed into a combustion chamber 90 (e.g., annular combustion chamber) of a combustor 92 (e.g., annular combustor) in the combustor section 46. Fuel is injected into the combustion chamber 90 by one or more fuel injectors 94 and mixed with the compressed core air to provide a fuel-air mixture. This fuel-air mixture is ignited and combustion products thereof flow through and sequentially drive rotation of the HPT rotor 55 and the LPT rotor 56 about the propulsion system axis 38. The rotation of the HPT rotor 55 and the LPT rotor 56 respectively drive rotation of the HPC rotor 54 and the LPC rotor 53 about the propulsion system axis 38 and, thus, compression of the air received from the core inlet 86. The rotation of the LPT rotor 56 also drives rotation of the propulsor rotor 52 about the propulsion system axis 38 through the drivetrain 64 and its geartrain 66. The rotation of the propulsor rotor 52 propels the bypass air through and out of the bypass flowpath 74. The propulsion of the bypass air may account for a majority of thrust generated by the turbine engine 24 of FIG. 1. Briefly, within the bypass flowpath 74, the guide vane structure 32 conditions (e.g., straightens out, de-swirls, etc.) the flow of bypass air propelled by the propulsor rotor 52 to enhance the forward thrust.

While the turbine engine 24 is described above with a particular two rotating structure arrangement, the present disclosure is not limited thereto. For example, the LPC rotor 53 may be omitted to configure the LPT rotor 56 as a power turbine (PT) rotor for the propulsor rotor 52. In another example, the turbine engine 24 may also include another rotating structure; e.g., an intermediate speed spool for the engine core 50.

Figure 2:
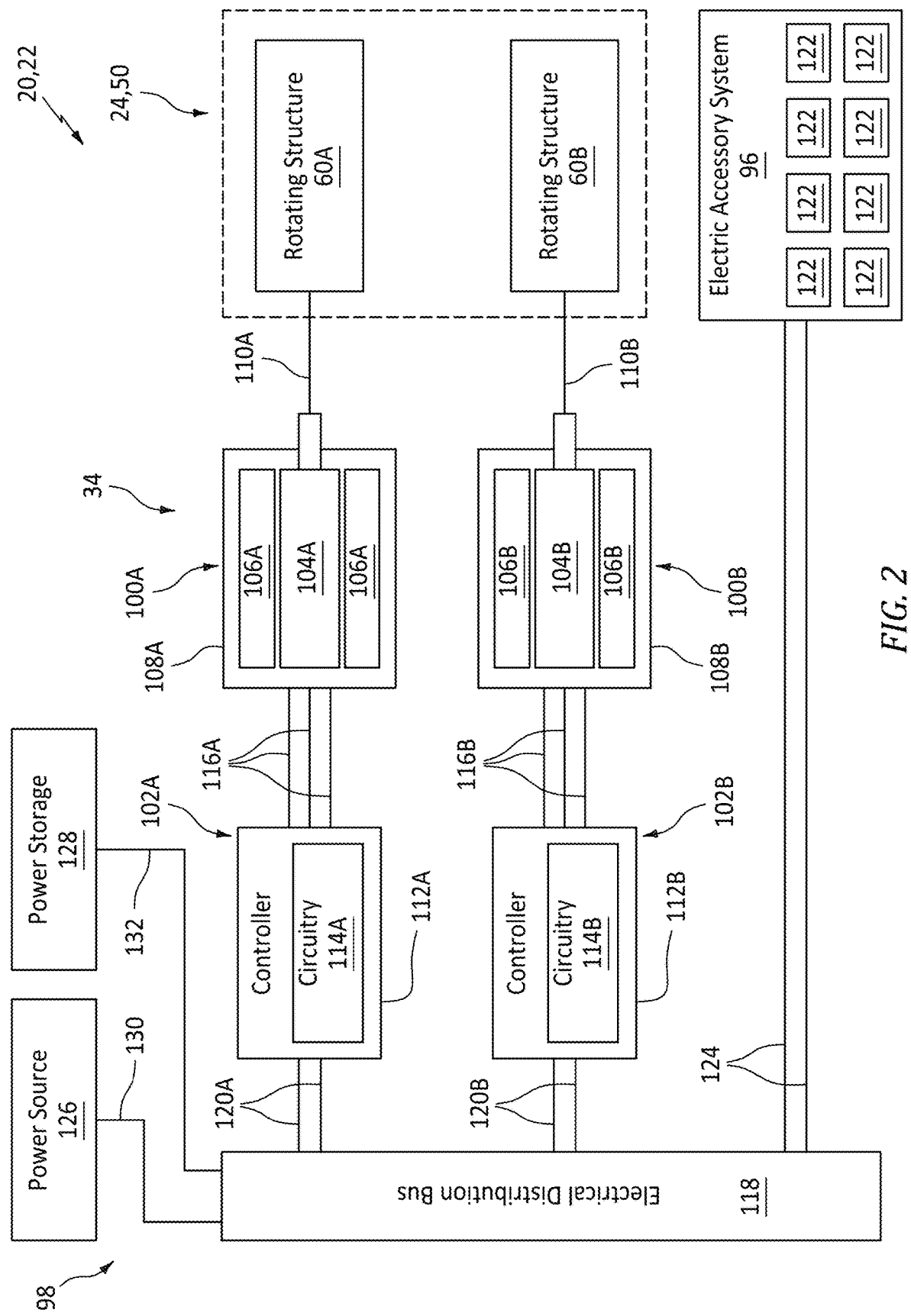
FIG. 2 is a schematic illustration of a portion of the aircraft propulsion system at an electric machine system.

Referring to FIG. 2, the electric machine system 34 is electrically coupled to an optional electric accessory system 96 and an electrical system 98 for the aircraft and its aircraft propulsion system 22. The electric machine system 34 of FIG. 2 includes one or more electric machines 100A and 100B (generally referred to as "100") and one or more electric machine (EM) controllers 102A and 102B (generally referred to as "102"). For ease of description, each electric machine 100 of FIG. 2 is described below as being electrically coupled to, controlled by and/or otherwise associated with a single, dedicated one of the EM controllers 102. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 100A, 100B of FIG. 2 includes an electric machine rotor 104A, 104B (generally referred to as "104"), an electric machine stator 106A, 106B (generally referred to as "106") and an electric machine housing 108A, 108B (generally referred to as "108"); e.g., a case. The machine rotor 104 is rotatable about a rotational axis of the machine rotor 104, which rotational axis may also be an axial centerline of the electric machine 100. The machine stator 106 of FIG. 2 is radially outboard of and circumscribes the machine rotor 104. With this arrangement, each electric machine 100 is configured as a radial flux electric machine. The electric machines 100 of the present disclosure, however, are not limited to such an exemplary rotor-stator configuration nor to radial flux arrangements. The machine rotor 104, for example, may alternatively be radially outboard of and circumscribe the machine stator 106. In another example, the machine rotor 104 may be axially next to the machine stator 106 configuring the respective electric machine 100 as an axial flux electric machine. Referring again to FIG. 2, the machine rotor 104 and the machine stator 106 are at least partially or completely housed within an interior of the machine housing 108.

Each electric machine 100A, 100B may be operatively coupled to a respective one of the engine rotating structures 60A, 60B (generally referred to as "60"). Each machine rotor 104A, 104B of FIG. 2, for example, is mechanically coupled to and rotatable with the respective engine rotating structure 60A, 60B through a drivetrain 110A, 110B (generally referred to as "110"). This drivetrain 110 may be configured as or otherwise include a shaft, a tower shaft assembly, an accessory gearbox, an angle gearbox, and/or the like. For case of description, each machine rotor 104 of FIG. 2 is described below as being coupled to and rotatable with a unique one of the engine rotating structures 60 of the turbine engine 24. However, it is contemplated multiple machine rotors may alternatively be coupled to and rotatable with a common engine rotating structure. It is also contemplated a single one of the machine rotors may be coupled to and rotatable with multiple engine rotating structures, directly or through another device such as a differential or a clutch system. In addition, while the electric machines 100 are described above as being coupled to the engine rotating structures 60, it is contemplated the machine rotor 104 of one or more of the electric machines 100 may alternatively be operatively coupled to another rotating device through the drivetrain 110 such as, but not limited to, a pump rotor, an auxiliary compressor rotor, an actuator rotor, or the like.

Each electric machine 100 of FIG. 2 may be configurable as an electric motor and/or an electric generator; e.g., an electric motor-generator. For example, during a motor mode of operation, a respective one of the electric machines 100 may operate as the electric motor to convert electricity received from the aircraft electrical system 98 into mechanical power. The machine stator 106, for example, may generate an electromagnetic field with the machine rotor 104 using a current of electricity received from the aircraft electrical system 98 through the respective EM controller 102. This electromagnetic field may drive rotation of the machine rotor 104. The machine rotor 104, in turn, may provide mechanical power to and drive rotation of the respective engine rotating structure 60 through the respective drivetrain 110. This mechanical power may be provided to boost power or completely power the rotation of the respective engine rotating structure 60. By contrast, during a generator mode of operation, the respective electric machine 100 may operate as the electric generator to convert mechanical power received from the respective engine rotating structure 60 into electricity. Rotation of the machine rotor 104, for example, may be rotationally driven by rotation of the respective engine rotating structure 60 through the respective drivetrain 110. The rotation of the machine rotor 104 may generate an electromagnetic field with the machine stator 106, and the machine stator 106 may convert energy from the electromagnetic field into electricity. The respective electric machine 100 may then provide a current of electricity to the aircraft electrical system 98 through the respective EM controller 102 for storage and/or further use. The electric machines 100 of the present disclosure, however, are not limited to such exemplary operation. For example, one, some or all of the electric machines 100 may alternatively each be configured as a dedicated electric generator; e.g., without the electric motor functionality. In another example, one, some or all of the electric machines 100 may alternatively each be configured as a dedicated electric motor; e.g., without the electric generator functionality.

Each EM controller 102A, 102B includes a controller housing 112A, 112B (generally referred to as "112") and internal controller circuitry 114A, 114B (generally referred to as "114"). The controller housing 112 may be configured as an enclosed case (e.g., a closed or sealed container) for the respective controller circuitry 114. The controller circuitry 114 is disposed within an interior of the controller housing 112; e.g., an internal chamber or other volume(s) within and enclosed by the controller housing 112. The controller circuitry 114 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), processing device(s), memory module(s), communication module(s), electrical transformer(s), electrical rectifier(s), and/or the like.

Each EM controller 102A, 102B is electrically coupled to a respective one of the electric machines 100A, 100B through one or more electric cables 116A, 116B (generally referred to as "116"); e.g., high voltage electric cables, power feeder cables, etc. More particularly, the controller circuitry 114 of each EM controller 102 is electrically coupled to the respective electric machine 100 and its machine stator 106 through the respective electric cables 116. Similarly, each EM controller 102A, 102B is electrically coupled to an electrical distribution bus 118 of the aircraft electrical system 98 through one or more electric cables 120A, 120B (generally referred to as "120"); e.g., high voltage electric cables, power feeder cables, etc. More particularly, the controller circuitry 114 of each EM controller 102 is electrically coupled to the aircraft electrical system 98 and its electrical distribution bus 118 through the respective electric cables 120.

Each EM controller 102 and its controller circuitry 114 are configured to control operation of a respective one of the electric machines 100. For example, when operating as the electric motor, the respective EM controller 102 and its controller circuitry 114 are configured to regulate a flow of electricity from the aircraft electrical system 98 to the respective electric machine 100. This electricity flow regulation may include: (a) turning-on the flow of electricity from the aircraft electrical system 98 to the respective electric machine 100 (e.g., electrically coupling the respective electric machine 100 to the aircraft electrical system 98); (b) turning-off the flow of electricity from the aircraft electrical system 98 to the respective electric machine 100 (e.g., electrically decoupling the respective electric machine 100 from the aircraft electrical system 98); (c) moderating the flow of electricity from the aircraft electrical system 98 to the respective electric machine 100. Here, the respective EM controller 102 operates as a motor controller. In another example, when operating as the electric generator, the respective EM controller 102 and its controller circuitry 114 are configured to regulate a flow of electricity from the respective electric machine 100 to the aircraft electrical system 98. This electricity flow regulation may include: (a) turning-on the flow of electricity from the respective electric machine 100 to the aircraft electrical system 98 (e.g., electrically coupling the respective electric machine 100 to the aircraft electrical system 98); (b) turning-off the flow of electricity from the respective electric machine 100 to the aircraft electrical system 98 (e.g., electrically decoupling the respective electric machine 100 from the aircraft electrical system 98); (c) moderating the flow of electricity from the respective electric machine 100 to the aircraft electrical system 98. Here, the respective EM controller 102 operates as a generator controller.

The electric accessory system 96 includes one or more electric devices 122. The electric devices 122 may include one or more electric actuators, one or more electric pumps, one or more electric valves and/or one or more fluid separator(s) (e.g., de-oiler(s)). The electric actuator(s) may include one or more electric linear actuators and/or one or more electric rotary actuators. The electric pump(s) may include one or more electric liquid pumps and/or one or more electric gas pumps (e.g., electric air compressor(s)). The electric devices 122 of FIG. 2 may be configured as part of one or more sub-systems for the aircraft propulsion system 22 and its turbine engine 24. Examples of these sub-systems include, but are not limited to: a fuel system for delivering the fuel to the fuel injectors (see FIG. 1); a lubrication system for delivering lubricant (e.g., oil) to one or more lubricated components (e.g., bearing(s), gear system(s), seal system(s), etc.) of the aircraft propulsion system 22 and its turbine engine 24; a cooling system for delivering coolant (e.g., liquid coolant, air, etc.) to one or more fluid cooled components of the aircraft propulsion system 22 and its turbine engine 24; and an actuation system for moving one or more adjustable components (e.g., variable guide vanes, a variable area nozzle, etc.) of the aircraft propulsion system 22 and its turbine engine 24. One, some or all of these sub-systems may be discrete (e.g., operationally, mechanically, fluidly, etc. independent) from one another. Alternatively, some of the sub-systems may be integrated to share, for example, a common working fluid such as the lubricant or the fuel. The present disclosure, however, is not limited to the foregoing exemplary electric devices or sub-systems which may include those electric devices.

Each electric device 122 is electrically coupled to the electrical distribution bus 118 of the aircraft electrical system 98 through one or more electric cables 124 (collectively schematically shown); e.g., high voltage electric cables, low voltage electric cables, power feeder cables, etc. Each electric device 122 may thereby receive a current of electricity from the aircraft electrical system 98 to power operation thereof.

The aircraft electrical system 98 includes the electrical distribution bus 118. This aircraft electrical system 98 may also include a power source 126 and/or a power storage 128. The electrical distribution bus 118 is electrically coupled to each of the electric machines 100 through their respective EM controllers 102. The electrical distribution bus 118 is electrically coupled to each of the electric devices 122. The electrical distribution bus 118 is also electrically coupled to the power source 126 and the power storage 128, schematically shown via 130 and 132 respectively. With this arrangement, the electrical distribution bus 118 provides an intermediate connection between the various electrical aircraft propulsion system members 100A (via 102A), 100B (via 102B), 122, 126 and/or 128. The power source 126 may be an electric generator powered by the turbine engine 24 or an electric generator powered by another aircraft powerplant; e.g., an engine of a companion aircraft propulsion system, an engine of an auxiliary power unit (APU), a fuel cell system, etc. The power storage 128 is configured to receive electricity from the electrical distribution bus 118 for storage. The power storage 128 is also configured to provide the stored electricity to the electrical distribution bus 118. The power storage 128, for example, may be configured as or otherwise include one or more electricity storage devices; e.g., batteries, super capacitors, etc. With the foregoing aircraft electrical system arrangement, the electrical current provided to one, some or all of the electric devices 122 may be received, through the electrical distribution bus 118, from any one, some or all of the electrical aircraft propulsion system members 100A, 100B, 126 and/or 128. It is also contemplated the electrical current provided to one of the electric machines 100 may be received from another one of the electric machines 100 through the aircraft electrical system 98 and its electrical distribution bus 118.

Figure 3:
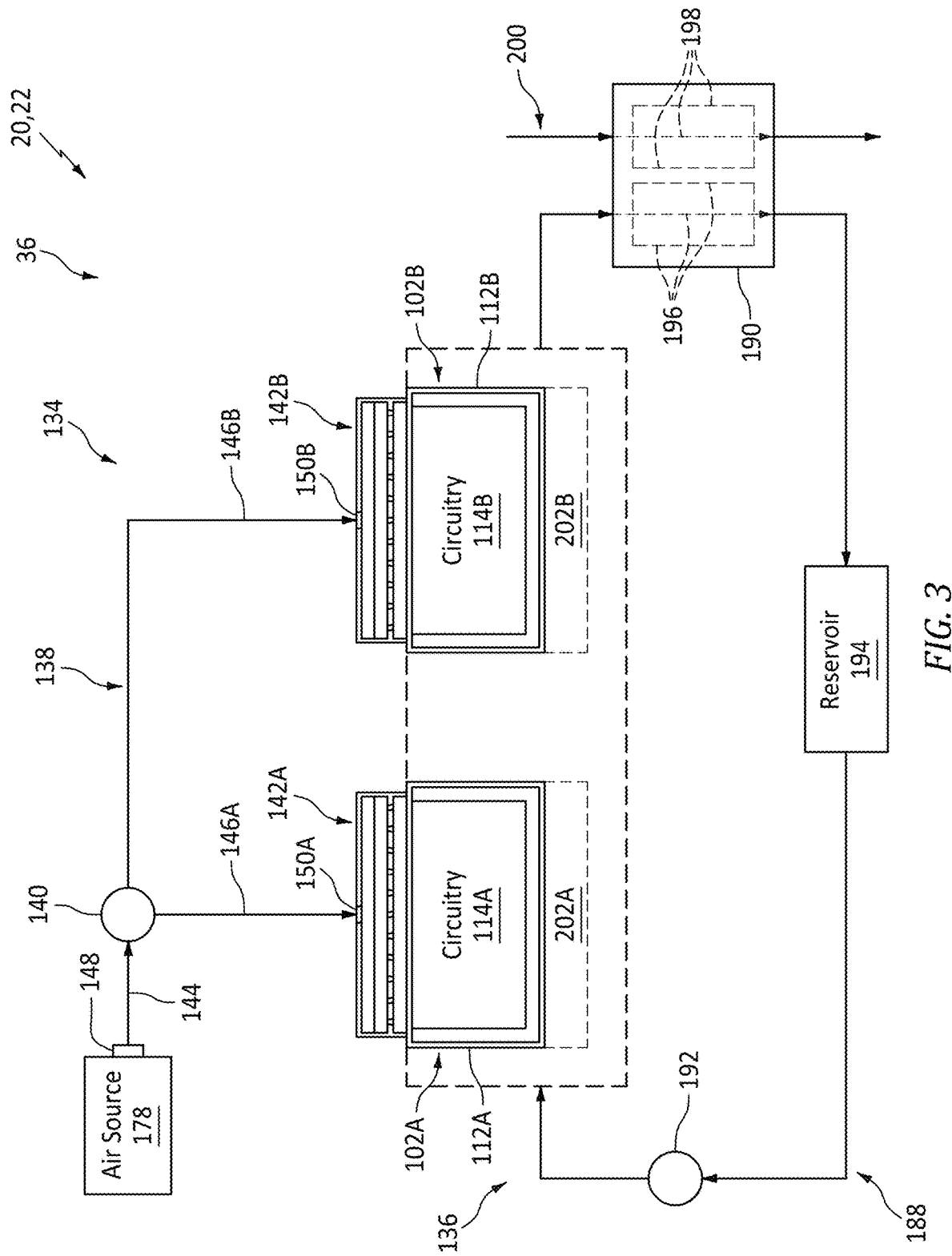
FIG. 3 is a schematic illustration of a portion of the aircraft propulsion system at a heat exchange system with multiple cooling circuits.

Referring to FIG. 3, the heat exchange system 36 includes an air cooling circuit 134 configured to air cool at least (or only) one or more of the EM controllers 102. The heat exchange system 36 may also include a liquid cooling circuit 136 configured to cool at least (or only) the one or more EM controllers 102 cooled by the air cooling circuit 134. Where the liquid cooling circuit 136 is configured to further cool one or more additional propulsion system components (not shown) such as one or more of the electric machines 100 (see FIG. 2), the liquid cooling circuit 136 may also or alternatively be configured to lubricate and/or otherwise service those additional propulsion system component(s).

The air cooling circuit 134 of FIG. 3 includes an air circuit path 138, an air circuit flow regulator 140 and one or more air circuit cooling boots 142A and 142B (generally referred to as "142"). Within the air cooling circuit 134, the air circuit components 140 and 142 are arranged inline along the air circuit path 138. The air circuit path 138 of FIG. 3, for example, includes a supply leg 144 and one or more (e.g., parallel) boot legs 146A and 146B (generally referred to as "146"). The supply leg 144 extends longitudinally from an inlet 148 into the air cooling circuit 134 and its air circuit path 138 to an inlet into the flow regulator 140. The first boot leg 146A extends longitudinally from a first outlet from the flow regulator 140 to an inlet 150A into the first cooling boot 142A. The second boot leg 146B extends longitudinally from a second outlet from the flow regulator 140 to an inlet 150B into the second cooling boot 142B. Of course, it is contemplated the air circuit path 138 may (or may not) also extend through and/or otherwise be fluidly coupled to various additional components (not shown) such as filter(s), sensor(s), heat exchanger(s), additional component(s), valve(s), pump(s), etc. The present disclosure therefore is not limited to the exemplary air cooling circuit arrangement shown in FIG. 3.

The flow regulator 140 is configured to regulate a flow of air through the air cooling circuit 134 and its air circuit path 138 from the air circuit inlet 148 to one or more of the downstream cooling boots 142. The flow regulator 140, for example, may be configured as a valve (e.g., a multi-way valve such as a three-way valve), a valve system or a flow diverter. During one mode of operation, the flow regulator 140 may direct all of the air received from the supply leg 144 into the first boot leg 146A for provision to the first cooling boot 142A. In another mode of operation, the flow regulator 140 may direct all of the air received from the supply leg 144 into the second boot leg 146B for provision to the second cooling boot 142B. In another mode of operation, the flow regulator 140 may direct the air received from the supply leg 144 into both (a) the first boot leg 146A for provision to the first cooling boot 142A and (b) the second boot leg 146B for provision to the second cooling boot 142B. During this mode of operation, the flow regulator 140 may direct uniform (e.g., equal) flows of the air into the first boot leg 146A and the second boot leg 146B. Alternatively, the flow regulator 140 may direct more of the air flow into the first boot leg 146A than the second boot leg 146B. Still alternatively, the flow regulator 140 may direct more of the air flow into the second boot leg 146B than the first boot leg 146A. In still another mode of operation, the flow regulator 140 may close (or otherwise divert the air flow received from the supply leg 144) such that neither of the boot legs 146 receives the air.

Figure 4:
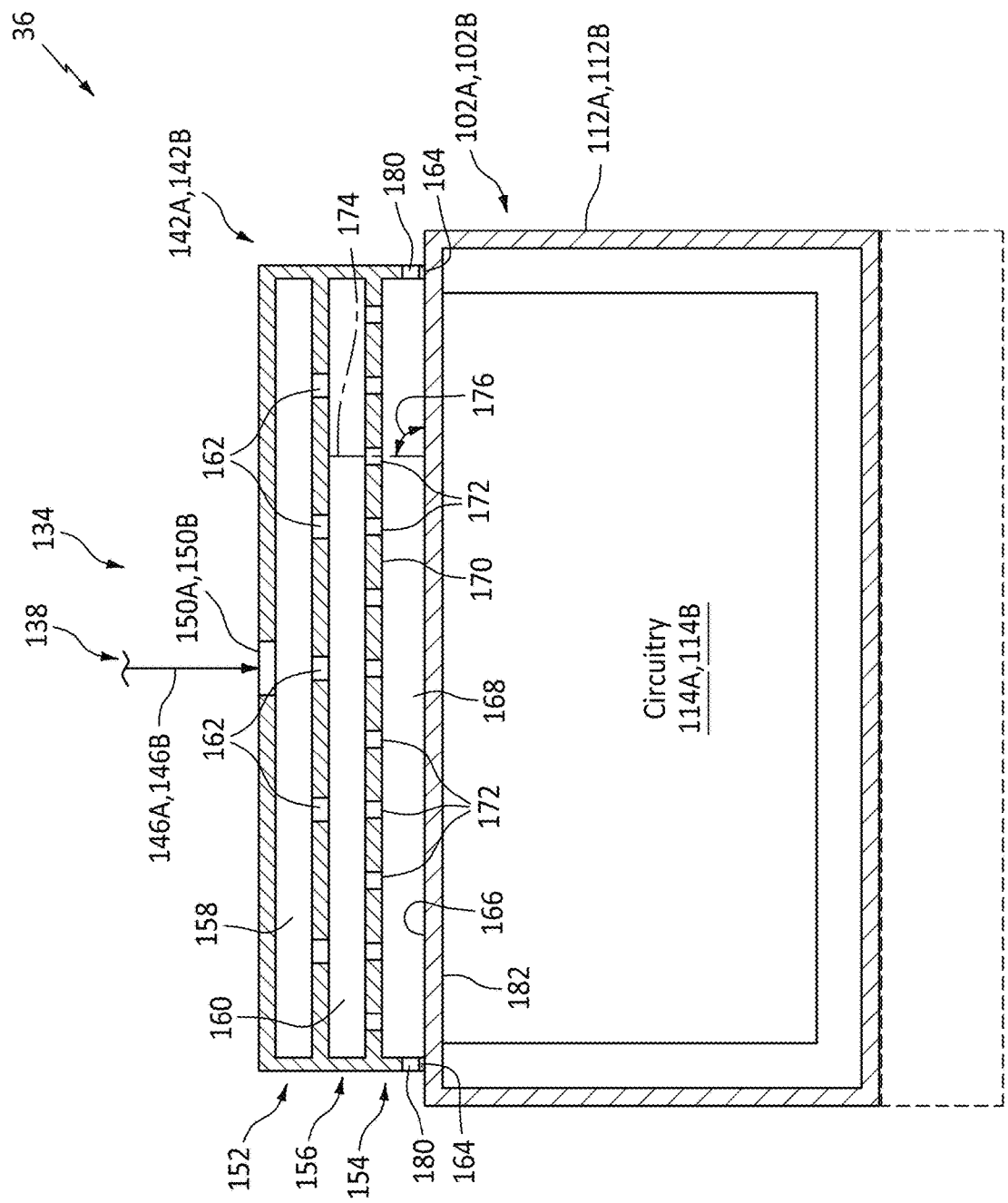
FIG. 4 is a schematic sectional illustration of a portion of the heat exchange system at a cooling boot.

Referring to FIG. 4, each cooling boot 142 is arranged with a respective one of the EM controllers 102. The cooling boot 142 of FIG. 4, for example, is disposed next to the respective EM controller 102. This cooling boot 142 may also be mounted to the respective EM controller 102. Alternatively, each cooling boot 142 may be mounted to another stationary component of the aircraft propulsion system 22 such as, but not limited to, the outer case 76 of FIG. 1 or the outer nacelle structure 78 of FIG. 1. Each cooling boot 142 of FIG. 4 includes an air reservoir 152, a boot curtain 154 and an air manifold 156.

The air reservoir 152 fluidly couples the respective boot leg 146 to the air manifold 156. An internal volume 158 (e.g., an air cavity) of the air reservoir 152 of FIG. 4, for example, is fluidly coupled to the respective boot leg 146 through the respective boot inlet 150A, 150B (generally referred to as "150"). The internal volume 158 of the air reservoir 152 is further fluidly coupled to an internal volume 160 (e.g., an air cavity) of the air manifold 156 through one or more feed apertures 162.

The boot curtain 154 projects out from the air manifold 156 to a distal edge 164 of the boot curtain 154. At this distal edge 164, the boot curtain 154 may contact or otherwise engage a controller surface 166 of the respective EM controller 102 and its controller housing 112. Alternatively, it is contemplated the boot curtain 154 may be slightly spaced form the controller surface 166. The boot curtain 154 may have an annular or partially annular configuration which substantially or completely forms an outer periphery of an air plenum 168 in the cooling boot 142 and its boot curtain 154. This air plenum 168 projects into the cooling boot 142 from the distal edge 164 to a manifold wall 170 of the air manifold 156. The air manifold 156 and its manifold wall 170 may thereby form an interior peripheral side of the air plenum 168. The respective EM controller 102 and its members 112 and 166 may form an exterior peripheral side of the air plenum 168.

The air manifold 156 fluidly couples the air reservoir 152 to the air plenum 168. The internal volume 160 of the air manifold 156 of FIG. 4, for example, is fluidly coupled to the internal volume 158 of the air reservoir 152 through the feed apertures 162 as described above. The internal volume 160 of the air manifold 156 is further fluidly coupled to the air plenum 168 through one or more air outlets 172; e.g., cooling air apertures such as impingement apertures. These air outlets 172 may be arranged in an array (e.g., a showerhead type array) along the air plenum 168. Each of the air outlets 172 projects along a centerline 174 of the respective air outlet 172 through the manifold wall 170 from the internal volume 160 of the air manifold 156 to the air plenum 168. Each outlet centerline 174 is angularly offset from the controller surface 166 by an offset angle 176. This offset angle 176 may be a right angle or close to a right angle. The offset angle 176, for example, may be between seventy degrees (70°) and ninety degrees (90°), inclusive. In other embodiments, however, it is contemplated the offset angle 176 associated with one or more of the air outlets 172 may alternatively be a non-zero acute angle equal to or less than seventy degrees (70°).

During operation of the air cooling circuit 134 of FIG. 3, the air circuit inlet 148 receives a flow of the air from an air source 178. The air circuit inlet 148 directs the received airflow into the air circuit path 138 and its supply leg 144. The flow regulator 140 selectively directs the air into one or more of the boot legs 146 to provide the air to the respective cooling boots 142. At each cooling boot 142, referring to FIG. 4, the air flows into the internal volume 158 of the air reservoir 152 from the respective upstream boot leg 146, where the air within the air reservoir 152 and the air within the respective upstream boot leg 146 may have a common (the same) or similar pressure. The feed apertures 162 provide a metered flow of the air into the internal volume 160 of the air manifold 156 from the air reservoir 152. The air outlets 172 subsequently direct the air into the air plenum 168 from the air manifold 156. Each air outlet 172, for example, may direct a flow (e.g., a stream, a jet, etc.) of the air along a trajectory across the air plenum 168 to impinge against the controller surface 166, where the trajectory may be parallel to (e.g., an extension of) the respective outlet centerline 174. Each cooling boot 142 may thereby facilitate impingement cooling of the respective EM controller 102. Moreover, as the air flows along the controller surface 166 within the air plenum 168 to one or more outlets 180 from the air plenum 168 (e.g., following the impingement), this airflow may convectively cool the respective EM controller 102. Each cooling boot 142 may thereby further facilitate convective cooling of the respective EM controller 102.

To enhance the foregoing air cooling of each EM controller 102, the controller circuitry 114 may be thermally coupled via conduction to the controller housing 112. Some or all of the controller circuitry 114 of FIG. 4, for example, may be mounted to a wall 182 or other structure of the controller housing 112 that forms the controller surface 166. The present disclosure, however, is not limited to such an exemplary arrangement of the controller circuitry 114 within the controller housing 112.

Figure 6:
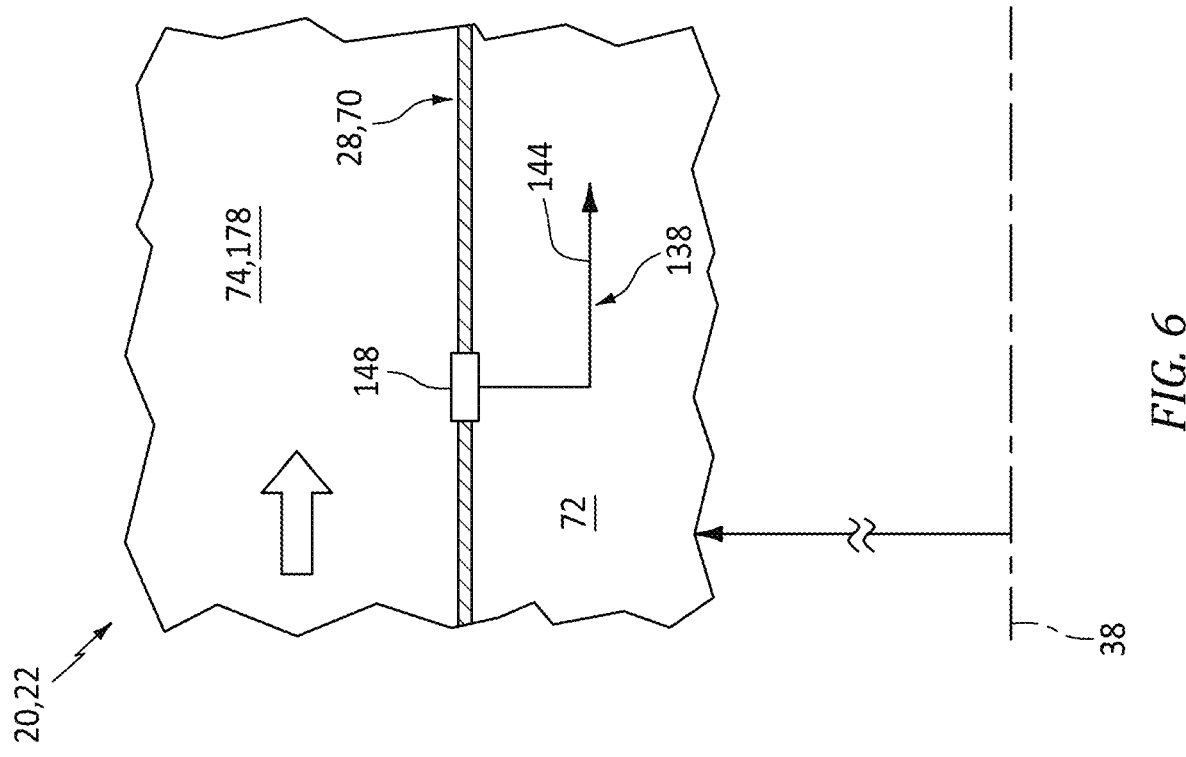
FIGS. 5 and 6 are schematic illustrations of a portion of the aircraft propulsion system with various air circuit inlet arrangements.
Figure 5:
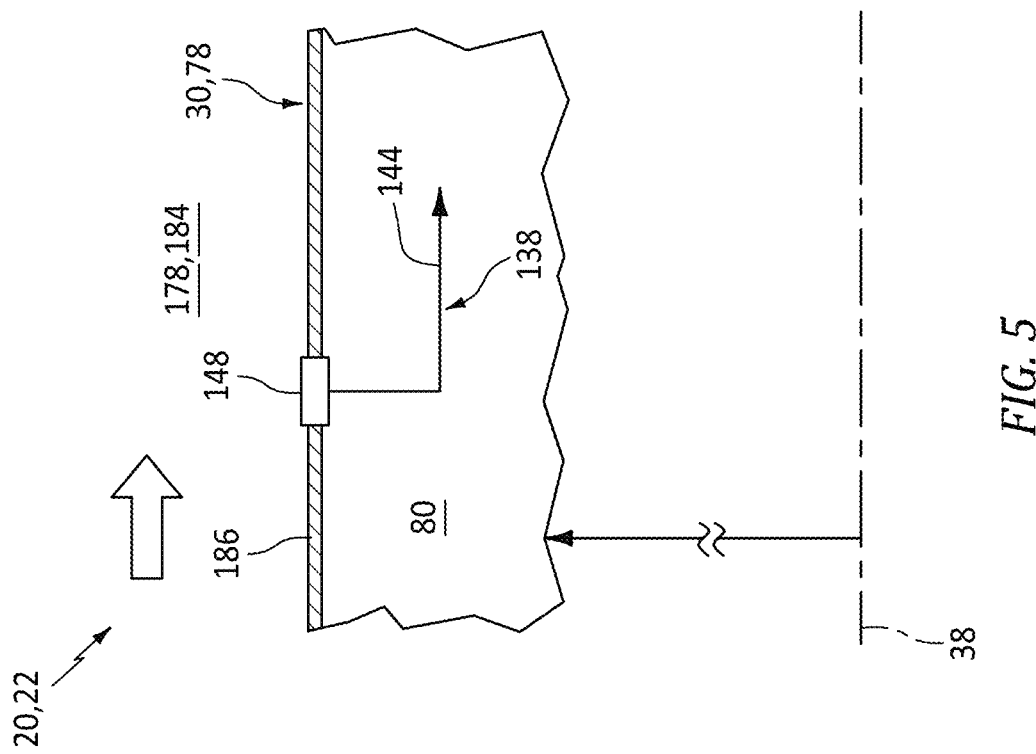

In some embodiments, referring to FIG. 5, the air source 178 may be external to (e.g., outside of) the aircraft propulsion system 22. The air source 178 of FIG. 5, for example, is configured as an environment 184 external to the aircraft propulsion system 22 (see also FIG. 1) and, more generally, external to the aircraft. In such embodiments, the air circuit inlet 148 may be configured as a scoop disposed along an exterior surface 186 of the outer housing structure 30 and its outer nacelle structure 78. Examples of this scoop include, but are not limited to, a NACA scoop and a ram-air scoop. In other embodiments, referring to FIG. 6, the air source 178 may be internal to (e.g., inside of) the aircraft propulsion system 22. The air source 178 of FIG. 6, for example, is configured as a flowpath within the aircraft propulsion system 22 such as, but not limited to, the bypass flowpath 74 (or the core flowpath 84 of FIG. 1). In such embodiments, the air circuit inlet 148 may be configured as a scoop or one or more bleed ports. The present disclosure, however, is not limited to the foregoing exemplary air sources.

Referring to FIG. 3, the liquid cooling circuit 136 includes a liquid circuit path 188, a liquid circuit heat exchanger 190 (HX), a liquid circuit pump 192 and a liquid circuit reservoir 194. Within this liquid cooling circuit 136, the liquid circuit components 190, 194 and 192 are arranged inline along the liquid circuit path 188. The liquid circuit path 188 of FIG. 3, for example, extends serially through the circuit components 190, 194 and 192 in a closed loop. The liquid circuit path 188 of FIG. 3 may also be (a) fluidly coupled to and extend in series or in parallel through the respective EM controllers 102A and 102B and/or (b) may be otherwise arranged in thermal communication with the respective EM controllers 102A and 102B through, for example, an optional controller heat exchanger 202A and 202B (generally referred to as "202"). Note, while the EM controllers 102 are shown as being upstream of the liquid circuit heat exchanger 190 along the liquid circuit path 188, it is contemplated one or more or all of these EM controllers 102 may alternatively be arranged downstream of the liquid circuit heat exchanger 190 along the liquid circuit path 188. In addition or alternatively, while the liquid circuit reservoir 194 is shown as being downstream of the liquid circuit heat exchanger 190 along the liquid circuit path 188, it is contemplated the liquid circuit reservoir 194 may alternatively be upstream of the liquid circuit heat exchanger 190 along the liquid circuit path 188. Moreover, it is contemplated the liquid cooling circuit 136 may (or may not) include various additional components (not shown) arranged along the liquid circuit path 188 such as filter(s), sensor(s), additional heat exchanger(s), additional component(s), valve(s), pump(s), etc. The present disclosure therefore is not limited to the exemplary liquid cooling circuit arrangement shown in FIG. 3.

The liquid circuit heat exchanger 190 includes one or more internal intra-circuit heat exchange (HX) passages 196 and one or more internal extra-circuit heat exchange (HX) passages 198. Each of these HX passages 196, 198 may be partially or completely formed by the liquid circuit heat exchanger 190. Each of the HX passages 196, 198 also extends within and/or through the liquid circuit heat exchanger 190. The intra-circuit HX passages 196 may form a section of or may otherwise be fluidly coupled inline with the liquid circuit path 188. The extra-circuit HX passages 198 may form a section of or may otherwise be fluidly coupled inline with a path 200 of another (e.g., liquid and/or gas) working fluid circuit for the aircraft propulsion system 22. The intra-circuit HX passages 196 are thereby fluidly discrete from the extra-circuit HX passages 198 within the liquid circuit heat exchanger 190. Within the liquid circuit heat exchanger 190, the intra-circuit HX passages 196 and the extra-circuit HX passages 198 may be arranged to configure the liquid circuit heat exchanger 190 as a cross-flow heat exchanger, a counterflow heat exchanger, a parallel flow heat exchanger, or a hybrid heat exchanger with a combination crossflow, counterflow and/or parallel flow arrangement.

The liquid circuit pump 192 is configured to direct and/or regulate a flow of a liquid working fluid (e.g., lubricant and/or a heat exchange fluid) through the liquid circuit path 188 from an outlet from (e.g., a supply of) the liquid circuit reservoir 194, through the EM controllers 102 and/or the controller heat exchangers 202, through the liquid circuit heat exchanger 190, to an inlet into (e.g., a return of) the liquid circuit reservoir 194.

The liquid circuit reservoir 194 is configured to contain a quantity of the working fluid before, during and/or after liquid cooling circuit operation. The liquid circuit reservoir 194, for example, may be configured as or otherwise include a tank, a cylinder, a pressure vessel, a bladder or any other type of (e.g., liquid) storage container.

During operation of the liquid cooling circuit 136 of FIG. 3, the liquid circuit pump 192 directs (e.g., pumps) relatively cool working fluid out of the liquid circuit reservoir 194, through the liquid circuit path 188, into the EM controllers 102 and/or the controller heat exchangers 202 that are thermally coupled to the EM controllers 102. As the working fluid flows through the EM controllers 102 and/or the controller heat exchangers 202, heat energy generated by the EM controllers 102 may be transferred into the working fluid. The heat energy transfer may thereby dissipate the heat energy in (e.g., cool) the EM controllers 102 while also heating the working fluid. The now heated working fluid is directed away from the EM controllers 102, through the liquid circuit path 188, to the liquid circuit heat exchanger 190. Within the liquid circuit heat exchanger 190, at least some or all of the heat energy previously transferred into the working fluid from the EM controllers 102 may be transferred out of the working fluid into a second working fluid flowing through the second circuit path 200 thereby cooling the working fluid. The now cooled working fluid is directed from the liquid circuit heat exchanger 190, through the liquid circuit path 188, back into the liquid circuit reservoir 194 of subsequent recirculation.

During one mode of operation, the air cooling circuit 134 and the liquid cooling circuit 136 of FIG. 3 may be operated concurrently. For example, the air cooling circuit 134 may be utilized to provide supplemental cooling when a cooling capability of the liquid cooling circuit 136 is diminished; e.g., when the turbine engine 24 is at idle and/or during aircraft descent. In another mode of operation, the air cooling circuit 134 may be operated without operating the liquid cooling circuit 136. The liquid cooling circuit 136, for example, may be non-operational where the liquid circuit pump 192 is turned off. In still another mode of operation, the liquid cooling circuit 136 may be operated without operating the air cooling circuit 134. The air cooling circuit 134, for example, may be non-operational where the flow regulator 140 is closed or otherwise diverts the air away from the downstream boot legs 146.

Where the liquid cooling circuit 136 includes the controller heat exchangers 202 thermally coupled to the EM controllers 102, each controller heat exchanger 202 may be configured as a cooling plate. In some embodiments, the controller heat exchanger 202 and the cooling boot 142 associated with a respective EM controller 102 may be disposed to opposing sides of that EM controller 102. The EM controller 102 may thereby be between and (e.g., directly) thermally coupled to the respective heat exchanger 202 and the respective cooling boot 142.

Figure 7:
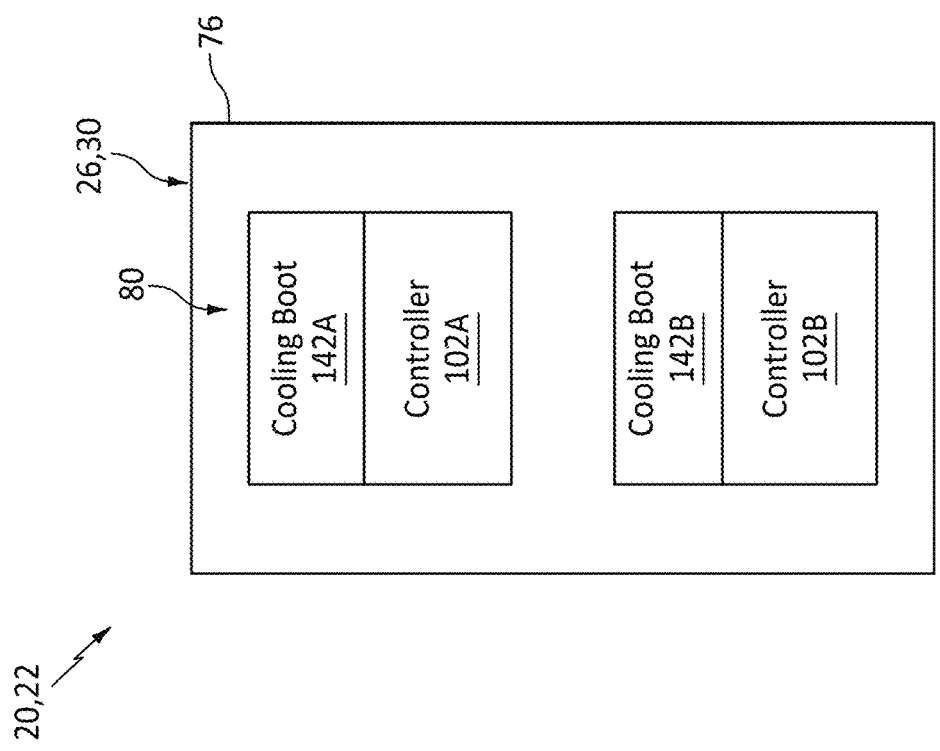
FIG. 7 is a schematic illustration of electric machine controllers and their cooling boots arranged within an internal compartment of the aircraft propulsion system.
Figure 10:
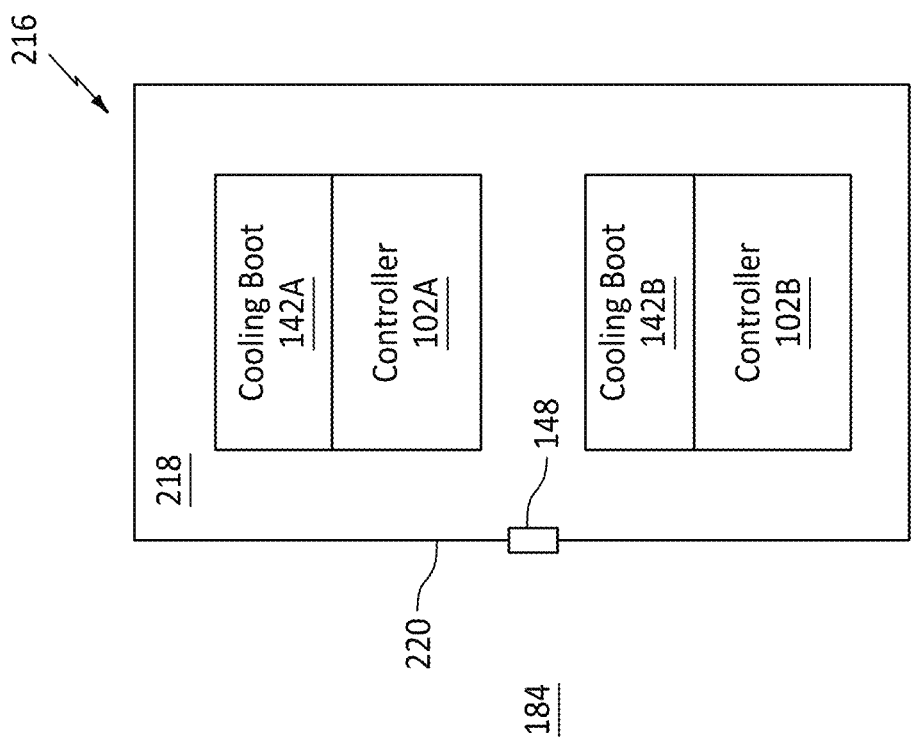
FIG. 10 is a schematic illustration of electric machine controllers and their cooling boots arranged within an aircraft structure.

In some embodiments, referring to FIG. 7, one or more of the EM controllers 102 serviced by the cooling circuits 134 and 136 of FIG. 3 may be arranged remote from the relatively hot engine core 50 (see FIG. 1) in order to reduce cooling requirements. The EM controllers 102 of FIG. 7, for example, may be arranged with the outer housing structure 30 within the outer housing compartment 80. The EM controllers 102, more particularly, may be directly or indirectly mounted to the outer case 76. The cooling boots 142 arranged with the EM controllers 102 may thereby also be arranged remote from the relatively hot engine core 50 (see FIG. 1); e.g., within the outer housing compartment 80. The present disclosure, however, is not limited to such an exemplary arrangement. For example, in other embodiments, it is contemplated one or more of the EM controllers 102 and, thus, the respective cooling boots 142 may alternatively be arranged with the inner housing structure 28 (see FIG. 1); e.g., within the inner housing compartment 72. In yet other embodiments, one or more of the EM controllers 102 and, thus, the respective cooling boots 142 may alternatively be arranged within an engine pylon, a wing, a fuselage, or another location remote from the hot engine core 50 (e.g., aircraft structure 216 of FIG. 10).

Figure 8:
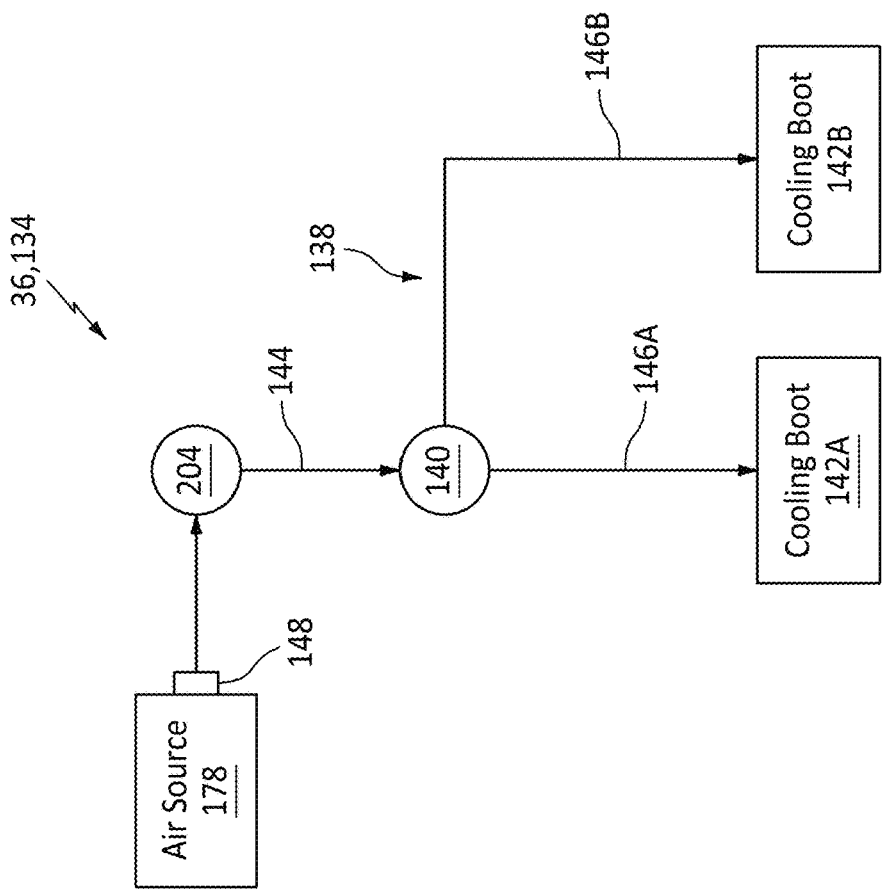
FIG. 8 is a schematic illustration of an air cooling circuit with an electric compressor.

In some embodiments, referring to FIG. 8, the air cooling circuit 134 may also include an electric compressor 204; e.g., a boost compressor. This electric compressor 204 may be arranged inline along the air cooling circuit 134 between the air circuit inlet 148 and the cooling boots 142. In some embodiments, the electric compressor 204 may be provided in addition to the flow regulator 140. In other embodiments, the electric compressor 204 may be provided as a replacement for the flow regulator 140 where, for example, the electric compressor 204 is used as a flow regulator. With this arrangement, the electric compressor 204 may boost a pressure of the incoming air directed into the air cooling circuit 134 from the air circuit inlet 148 as needed. This may be particularly useful where the aircraft propulsion system 22 is configured as an open rotor aircraft propulsion system as described below in further detail.

The aircraft propulsion system 22 of FIG. 1 is described above as a ducted propulsor propulsion system; e.g., the turbofan propulsion system. However, as described above, the present disclosure is not limited to such an exemplary aircraft propulsion system. For example, referring to FIG. 9, the outer housing structure 30 (see FIG. 1) may be omitted from the propulsion system housing 26 to open the propulsor rotor 52 up to the external environment 184. More particularly, the propulsor rotor 52 of FIG. 9 includes a plurality of open propulsor blades 206 arranged circumferentially about the propulsion system axis 38 in an array (e.g., a circular array), which array of propulsor blades may be unshrouded or alternatively shrouded by a tubular propulsor rotor shroud dedicated to the propulsor rotor 52 for example. Each of these propulsor blades 206 projects radially out from a base of the propulsor rotor 52, into the external environment 184, to a distal tip 208 of the respective propulsor blade 206. Each propulsor blade 206 is thereby configured as an un-ducted propulsor blade which is exposed to (e.g., disposed in) the surrounding external environment 184. With this arrangement, the propulsor rotor 52 is an open propulsor rotor (e.g., an un-ducted propulsor rotor) and the aircraft propulsion system 22 is configured as an open rotor propulsion system.

Figure 9:
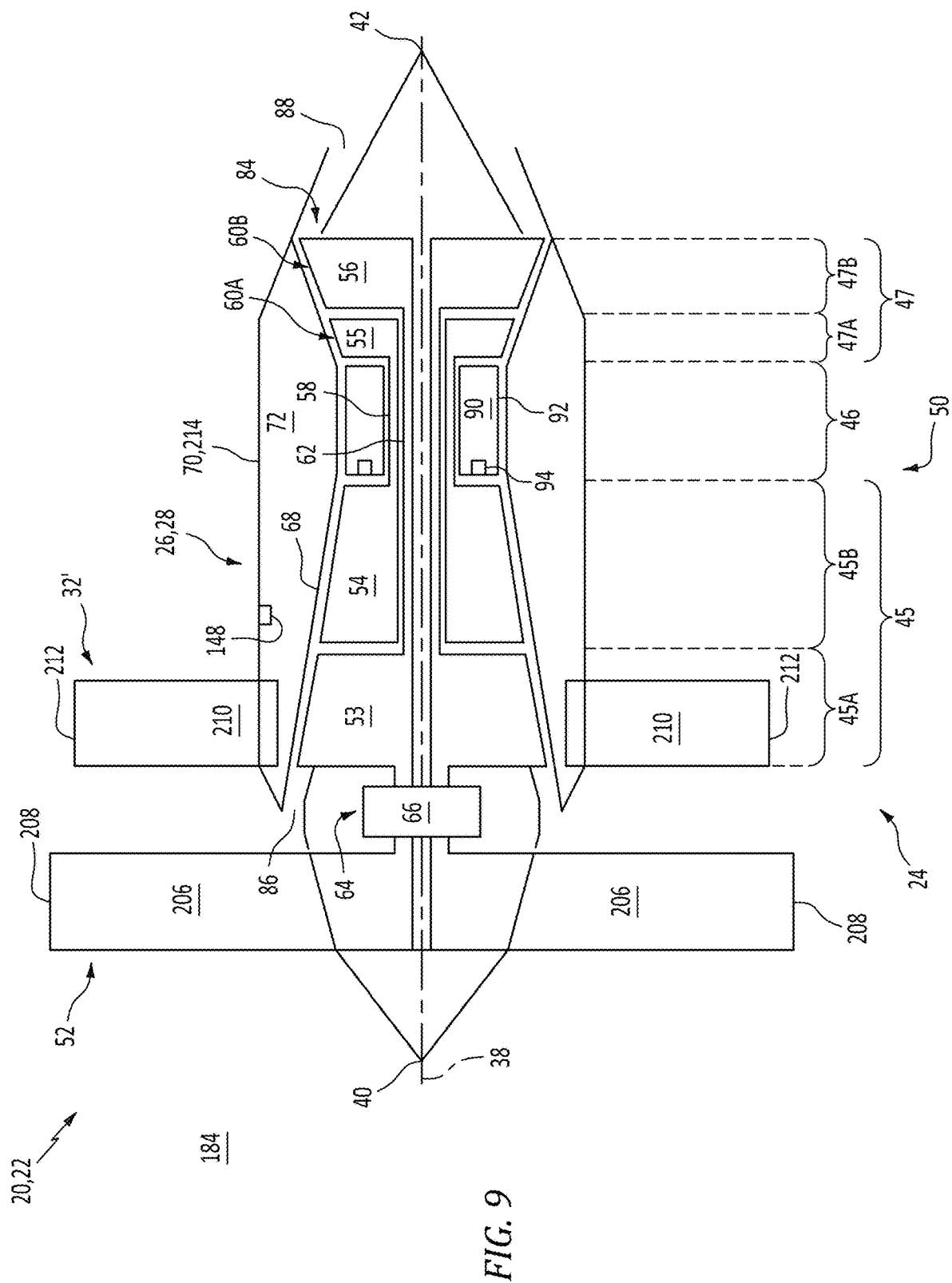
FIG. 9 is a partial side schematic illustration of the aircraft propulsion system with an open propulsor rotor.

The aircraft propulsion system 22 of FIG. 9 is configured with an open guide vane structure 32'. This guide vane structure 32' of FIG. 9 includes a plurality of open exit guide vanes 210; e.g., airfoils. The guide vanes 210 are arranged and may (or may not) be equispaced circumferentially about the propulsion system axis 38 in an array (e.g., a circular array), which array of guide vanes may be unshrouded or alternatively shrouded by a tubular guide vane shroud dedicated to the guide vane structure 32' for example. This guide vane structure 32' and its guide vanes 210 are arranged axially next to (e.g., adjacent) the propulsor rotor 52 and its propulsor blades 206. The guide vane structure 32' and its guide vanes 210 of FIG. 9, for example, are arranged downstream of the propulsor rotor 52 and its propulsor blades 206, without (e.g., any) other elements axially therebetween to obstruct, turn and/or otherwise influence the air propelled by the propulsor rotor 52 to the guide vane structure 32' for example. Each of the guide vanes 210 projects radially out from an exterior surface of the inner housing structure 28, into the external environment 184, to a distal tip 212 of the respective guide vane 210. Each guide vane 210 is thereby configured as an un-ducted guide vane which is exposed to (e.g., disposed in) the surrounding external environment 184. With the foregoing arrangement, the guide vane structure 32' and its guide vanes 210 are configured to condition (e.g., straighten out, de-swirl, etc.) an outer stream of air propelled by the propulsor rotor 52 within the external environment 184 that bypass the engine core 50. Of course, in other embodiments, the guide vane structure 32' may be omitted where, for example, the aircraft propulsion system 22 is alternatively configured as a counter-rotating open rotor (CROR) aircraft propulsion system, etc.

Where the air source 178 of FIG. 3 is the external environment 184 of FIG. 1 or 9, the air circuit inlet 148 may be configured as a scoop disposed along an exterior surface 214 of the housing structure 28 and its nacelle structure 70. Here, one or more of the EM controllers 102 and the associated cooling boots 142 (see FIG. 3) may be arranged with the housing structure 28, for example within the housing compartment 72. In other embodiments, referring to FIG. 10, one or more of the EM controllers 102 and the associated cooling boots 142 may be arranged with a structure 216 of the aircraft remote from the relatively hot turbine engine 24 and its engine core 50. The EM controllers 102 and the associated cooling boots 142 of FIG. 10, for example, are arranged within an internal compartment 218 of the aircraft structure 216. Examples of the aircraft structure 216 include, but are not limited to; a pylon structure mounting the aircraft propulsion system 22 (see FIG. 1 or 9) to a wing or a fuselage of the aircraft; the wing of the aircraft; or the fuselage of the aircraft. Moreover, the air circuit inlet 148 may also be disposed along an exterior surface 220 of the aircraft structure 216. The present disclosure, however, is not limited to such exemplary arrangements.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an aircraft, comprising:
   an electric machine controller including controller circuitry and a controller housing, the controller circuitry disposed within an interior of the controller housing;
   an air cooling circuit comprising a cooling boot, the air cooling circuit configured to direct air from an air source into the cooling boot, the cooling boot forming an air plenum with the electric machine controller, the cooling boot comprising a plurality of air outlets, and the cooling boot configured to direct the air through the plurality of air outlets and into the air plenum to air cool the electric machine controller; and
   an electric machine configurable as at least one of an electric motor or an electric generator, the electric machine controller configured to control operation of the electric machine.

2. The apparatus of claim 1, wherein the cooling boot is configured such that the air directed into the air plenum impingement cools the electric machine controller.

3. The apparatus of claim 1, wherein the cooling boot is configured such that the air directed into the air plenum convectively cools the electric machine controller.

4. The apparatus of claim 1, wherein
   the cooling boot further comprises a manifold with a wall and an air cavity;
   the wall is between and extends along the air cavity and the air plenum; and
   each of the plurality of air outlets extends through the wall from the air cavity to the air plenum.

5. The apparatus of claim 1, wherein
   the air plenum extends along a surface of the electric machine controller; and
   a centerline of a first of the plurality of air outlets is angularly offset from the surface by an offset angle between seventy degrees and ninety degrees.

6. The apparatus of claim 1, wherein at least some of the controller circuitry is mounted to a wall of the controller housing that forms a side of the air plenum.

7. The apparatus of claim 1, wherein at least some of the controller circuitry is thermally coupled to a wall of the controller housing that forms a side of the air plenum.

8. The apparatus of claim 1, wherein the air cooling circuit further comprises a flow regulator arranged inline between the air source and the cooling boot.

9. The apparatus of claim 1, wherein the air cooling circuit further comprises a compressor arranged inline between the air source and the cooling boot.

10. The apparatus of claim 1, wherein
the air source is an environment external to the aircraft; and
the air cooling circuit further comprises an air circuit inlet that fluidly couples the air cooling circuit to the environment.

11. The apparatus of claim 1, further comprising:
an engine case;
the electric machine controller mounted with the engine case, and the electric machine controller disposed between the engine case and the cooling boot.

12. The apparatus of claim 1, further comprising a liquid cooling circuit configured to further cool the electric machine controller using a liquid working fluid.

13. The apparatus of claim 1, further comprising:
a turbine engine including a flowpath, a compressor section, a combustor section and a turbine section;
the flowpath extending through the compressor section, the combustor section and the turbine section; and
the electric machine operatively coupled to the turbine engine.

14. The apparatus of claim 1, further comprising:
an aircraft propulsion system comprising an open propulsor rotor;
the aircraft propulsion system configured with the electric machine controller and the air cooling circuit.

15. The apparatus of claim 1, further comprising:
an aircraft propulsion system comprising a ducted propulsor rotor;
the aircraft propulsion system configured with the electric machine controller and the air cooling circuit.

16. An apparatus for an aircraft, comprising:
an aircraft propulsion system including an engine core, an electronic controller, an air cooling circuit and a liquid cooling circuit;
the engine core including a compressor section, a combustor section and a turbine section;
the electronic controller disposed within an internal compartment of the aircraft propulsion system;
the air cooling circuit comprising a cooling boot, the air cooling circuit configured to direct air from an air source outside of the engine core into the cooling boot, the cooling boot forming an air plenum with the electronic controller, the cooling boot comprising a plurality of air outlets, and the cooling boot configured to direct the air through the plurality of air outlets and into the air plenum to air cool the electronic controller; and
the liquid cooling circuit configured to cool the electronic controller using a liquid working fluid.

17. The apparatus of claim 16, wherein the air source is an environment external to the aircraft propulsion system.

18. The apparatus of claim 16, wherein the electronic controller includes controller circuitry and a controller housing, and the controller circuitry is disposed within an interior of the controller housing.

19. The apparatus of claim 18, wherein at least some of the controller circuitry is at least one of mounted to or thermally coupled a wall of the controller housing that forms a side of the air plenum.

20. An apparatus for an aircraft, comprising:
an aircraft propulsion system including an open propulsor rotor, an electronic controller and an air cooling circuit;
the electronic controller disposed within an internal compartment of the aircraft propulsion system, the electronic controller including controller circuitry and a controller housing, and the controller circuitry disposed within an interior of the controller housing; and
the air cooling circuit comprising an air circuit inlet and a cooling boot, the air circuit inlet disposed along an exterior surface of the aircraft propulsion system bordering an environment external to the aircraft propulsion system, the air cooling circuit configured to direct air, received from the environment through the air circuit inlet, into the cooling boot, the cooling boot forming an air plenum with the electronic controller, the cooling boot comprising a plurality of air outlets, and the cooling boot configured to direct the air through the plurality of air outlets and into the air plenum to air cool the electronic controller.

* * * * *